(12) United States Patent
Potesta

(10) Patent No.: US 11,575,948 B2
(45) Date of Patent: *Feb. 7, 2023

(54) METHOD AND PLATFORM FOR AUTOMATIC SELECTION OF VIDEO SEQUENCES TO FILL A BREAK IN A PROGRAM

(71) Applicant: AD Insertion Platform Sarl, Chernex (CH)

(72) Inventor: Laurent Potesta, Chernex (CH)

(73) Assignee: AD INSERTION PLATFORM SÀRL, Chernex (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,036

(22) Filed: Sep. 29, 2020

(65) Prior Publication Data

US 2021/0029387 A1 Jan. 28, 2021

Related U.S. Application Data

(63) Continuation of application No. 15/738,726, filed as application No. PCT/IB2016/053720 on Jun. 22, 2016, now Pat. No. 10,820,018.

(30) Foreign Application Priority Data

Jun. 22, 2015 (EP) ..................................... 15173151

(51) Int. Cl.
*H04N 7/10* (2006.01)
*H04N 7/025* (2006.01)
(Continued)

(52) U.S. Cl.
CPC ......... *H04N 21/232* (2013.01); *H04N 21/222* (2013.01); *H04N 21/235* (2013.01);
(Continued)

(58) Field of Classification Search
CPC ............... H04N 21/232; H04N 21/222; H04N 21/23424; H04N 21/235; H04N 21/237;
(Continued)

(56) References Cited

U.S. PATENT DOCUMENTS

| 2003/0046687 A1 | 3/2003 | Hodges et al. |
| 2011/0022471 A1 | 1/2011 | Brueck et al. |
| 2012/0185895 A1 | 7/2012 | Wong et al. |
| 2013/0097634 A1* | 4/2013 | Jin .......................... G11B 27/28 725/34 |
| 2013/0191865 A1 | 7/2013 | Khare |

(Continued)

FOREIGN PATENT DOCUMENTS

EP 1304880 A1 4/2003

OTHER PUBLICATIONS

International Search Report for PCT/IB2016/053720 dated Sep. 12, 2016.
Written Opinion for PCT/IB2016/053720 dated Sep. 12, 2016.

*Primary Examiner* — Mulugeta Mengesha
(74) *Attorney, Agent, or Firm* — Pearne & Gordon LLP

(57) ABSTRACT

A method for automatic selection of video sequences to fill a break in a broadcasted program, including determining an estimated duration of the break ($b_i$) and selecting from a collection of videos, such as advertisements, a sequence of videos to be played out. The sequence has a second duration which is shorter than the estimated duration and the selection depends on broadcast priority criteria associated with at least some of said videos. The method also includes broadcasting the sequence of videos and broadcasting a fill-in video signal until the end of the break.

28 Claims, 7 Drawing Sheets

(51) Int. Cl.

| | |
|---|---|
| *H04N 21/232* | (2011.01) |
| *H04N 21/61* | (2011.01) |
| *H04N 21/234* | (2011.01) |
| *H04N 21/81* | (2011.01) |
| *H04N 21/262* | (2011.01) |
| *H04N 21/222* | (2011.01) |
| *H04N 21/235* | (2011.01) |
| *H04N 21/237* | (2011.01) |
| *H04N 21/654* | (2011.01) |

(52) U.S. Cl.
CPC ..... *H04N 21/237* (2013.01); *H04N 21/23424* (2013.01); *H04N 21/26233* (2013.01); *H04N 21/6125* (2013.01); *H04N 21/654* (2013.01); *H04N 21/812* (2013.01)

(58) Field of Classification Search
CPC ......... H04N 21/26233; H04N 21/6125; H04N 21/654; H04N 21/812
See application file for complete search history.

(56) References Cited

U.S. PATENT DOCUMENTS

| | | | | |
|---|---|---|---|---|
| 2013/0268963 | A1* | 10/2013 | Nugent | H04N 21/812 725/32 |
| 2014/0068662 | A1* | 3/2014 | Kumar | H04N 21/26233 725/34 |
| 2015/0237389 | A1* | 8/2015 | Grout | H04N 21/458 725/49 |
| 2015/0325268 | A1* | 11/2015 | Berger | H04N 21/4335 386/248 |
| 2018/0285932 | A1* | 10/2018 | Andrianakou | G06Q 30/0269 |

* cited by examiner

| ID | J | SP1 | SP2 | SP3 | J | F |
|---|---|---|---|---|---|---|
|    |   | P1  | P2  | P3  |   |   |

METHOD AND PLATFORM FOR AUTOMATIC SELECTION OF VIDEO SEQUENCES TO FILL A BREAK IN A PROGRAM

FIELD OF THE INVENTION

The present invention concerns a method and platform for filling breaks in programs.

DESCRIPTION OF RELATED ART

Video and video programs often includes breaks, such as commercial breaks which are inserted before to be sent by a broadcaster or video server over a TV broadcasting network or over the Internet. This situation is illustrated on FIG. 4. A main program p is played out until time t0, where it is replaced by a break $b_i$. At t1, the break is terminated and the main program p resumes. Each commercial break usually includes a sequence of advertisings usually assembled in advance by the broadcaster based on its advertisement campaigns for this TV channel or video program.

In order to increase the revenue from publicity, it is already known to adapt the content of the break to different audiences or regions. In USA, local TV companies often redistribute satellite channels in their network, and replace some of the country-wide advertising with local ads. In Europe, commercial breaks, sport programs and news are often adapted to each specific national audience. For example, it is also known to replace in some countries specific programs for which the broadcaster doesn't have the right by another content. A platform is Switzerland may for example replace the advertisings in French TV programs by Swiss advertisings, and/or replace some sport programs by pre-recorded content due to rights issues.

Therefore, platforms in local networks or in other countries, which replace the content of some breaks by a localized content better focused at the audience of the local network are already known.

In order to increase the flexibility, platforms often don't store the advertising videos, but access it through one advertising video server, for example an Internet server operated by one web advertising agency. The platform thus generates a new video stream, in replacement or in addition to existing video streams, including videos from the advertising video server, as well as other elements such as jingles or still pictures.

The selection of advertising videos to be played out during a specific break is often done manually, depending on reservations or bids from the advertising agency. This selection is a tedious and error-prone process, and there is a need in the prior art for a more automated process.

Different breaks may have different requirements. For example, the operator of a platform likely wants to send the most expensive ads during prime time, and lower priority ads outside of prime time periods. Within breaks, the first and last advertisings slots are preferred by most advertisers since they are more likely to be watched.

Usually, the start time t0 and end time t1 of each commercial break $b_i$, and therefore its duration $d_i$, are defined in advance and stored in a broadcaster server that is the source for the TV schedule and generate the TV signal. In broadcast mode, those start and end time may also be transmitted over the SCTE-35 standard or over the ESAM protocol. The duration is also known if the video is transmitted in streaming mode, for example using the HLS or MPEG-Dash protocol.

However, this duration is not always known in advance, or could be different from what was expected from the broadcast server or SCTE-35/ESAM message. It is for example common in live programs that the start time and/or the end time and/or duration of the break are changed at the very last moment, depending on the program. For example, a broadcaster may decide to play commercial breaks during the interruptions of a football play, whose start time, number and durations are unpredictable. Commercial breaks may be shortened, prolonged, delayed, cancelled, added, or split. The exact duration of a sport program, such as a football or tennis game, is difficult to estimate with precision.

It is difficult for a platform to prepare a sequence of videos to be played out when the duration of the break is unpredictable and not with a pre-formatted duration.

In order to solve the problem of a local content whose duration exceeds the duration of a break in the original program, EP1304880 suggests to store the original program in a buffer memory and to resume the lecture from this buffer when the local content has been entirely played out. The broadcasting of the program is thus deferred. This might be an issue when the original program must be played live, for example during the diffusion of a sport program or other live program.

US2014/0068662 discloses another method and apparatus for selection of advertisements to fill a commercial break of an unknown duration. According to this method, an estimated of the duration of a next commercial break is made. An advertisement list of a duration corresponding to the estimate is then prepared and played out. It may happen that the estimate of the duration of the next commercial event is less than the actual commercial break duration, thereby resulting in situations where the selected advertisements do not entirely fill the actual commercial break. In such a case, the advertisement system returns to the first step and estimates the remaining duration of the break, and fills it with new advertisements. If, on the other end, a commercial break has elapsed before the end an advertisement, then it is determined whether the portion of the event between the expiration time and the end of the overlapping advertisement is important or not. If it is important, then the event is stored in a buffer and played with a delay at the end of the advertisement. If this portion is not important, then it is replaced with the end of the advertisement. This solution is also not adapted to constraints where, for example, a specific advertisement must be played during a specific break plus or minus 30 or 60 minutes for example.

This solution is well adapted to countries, like the US for example, where commercial breaks and advertisements are played in predefined slots with standard durations, for example multiple of 30 seconds. In such a situation, it is relatively easy to have the end of a commercial break coincide with the end of an advertising in the list. The unfortunate situation where a portion of the program is replaced by an advertising or delayed is therefore quite rare.

In other countries, like continental Europe, TV advertisings are not played in predefined slots and don't have standard durations; their duration may be random. It is therefore often difficult or even impossible to build a list of advertising that fills exactly a break of a given duration. The same usually appears for advertisings inserted during video streams on the Internet.

US2011/0022471 discloses the delivery of content in breaks in live events broadcasted over the internet. In one embodiment, the remaining time of an advertisement break is filled with filler content. However, the system offers little possibilities for defining the format of the sequence of advertising videos in the break.

BRIEF SUMMARY OF THE INVENTION

It is therefore an aim of the present invention to propose a method and apparatus that avoids the above mentioned problems of the prior art.

According to one aspect, the invention is related to a method for automatic selection of a sequence of videos to fill a break in a video program, comprising:

storing a plurality of templates in a collection of templates accessible from a platform, wherein each template determines a sequence of video types to be played out, the available video types including at least jingles; fill-in video content; advertising video from a first video server; advertising video from a second video server;

selecting one template from the collection to apply to said break, the selected template requesting advertising videos from a first video server, advertising videos from a second video server and at least one jingle or fill-in video content;

determining in the platform a first duration of a series of advertising videos from the first video server and a second duration of a series of advertising videos from the second video server;

sending from said platform a first request for a first series of advertising videos to the first video server corresponding to the first duration, and a second request for a second series of advertising videos to the second video server corresponding to the second duration;

receiving in said platform a first series of advertising video from the first video server and a second series of advertising videos from the second video server;

stitching in said platform a sequence including said first series, said second series and at least one jingle or fill-in video content, according to the selected template;

sending said sequence to at least one user's end device.

This method provides several benefits.

According to one aspect, the use of a plurality of templates for defining sequences of video types makes it easier to define video play rules and to determine how videos should be selected and played out during the break.

A template thus controls the format of the sequence of video content that will be played during each break, without defining more precisely each advertising video in the sequence. Templates can be reused, edited and applied, to make an automatic selection of videos easier and more likely to match the expectations of the operator. By defining, selecting and applying templates, an operator can make sure that even a sequence of automatically selected videos, or videos selected externally in external video servers, will follow some video play rules.

The use of a plurality of video servers for delivering series of advertising videos increases the number of sources that can be used for filling the breaks. By defining the sequence of video servers to be used in each template, one can for example insure that a first server (for example a video server including mainly advertising from prime advertisers) will be used to fill the best slots in each sequence (for example the first ads or the last ads played during the break), while a second server (for example a video server with less expensive ads) will be used to fill other, less demanded slots.

According to one aspect, the method comprises a determination in the platform of an estimated duration of the break. At least one selected template requests a fill-in video content to be played out until the end of the break, wherein the fill-in video content is a video without any speech which can be appropriately interrupted at any time.

The first video server may select the videos in the first series. The second video server may select the videos in the second series. The platform receives both series, stitch them with additional content, and generates a video sequence corresponding to the selected template to fill the break.

The platform may send selection parameters to at least one of the selected video servers. The selection of videos made by this selected video server depends on those parameters.

The selection parameters sent to the video servers include one or more of:
a type of device;
a user profile;
a category of advertising;
an IP address;
a related program.

The parameters allow a selection of videos which is dependent on the type of device (for example desktop, tablet, smartphone, set-top box, etc.), on a user profile (for example user profile stored or derived from cookies), on a category of products (for example to avoid two advertising for a similar type of products to be run one after the other), on the IP address (and thus on the localisation of the user), etc.

At least some of the videos may be associated with video priorities. Videos associated with a higher priority are more likely to be played out than videos associated with a lower priority. The selection may be made in the video server and/or in the platform.

The selected template to be applied, and/or the sequence of video types in one selected template, may also depend on at least one among:
a type of device;
a user profile;
a category of advertising;
an IP address;
a related program.

The platform may insert or edit or otherwise use codes, for example time codes, in the sequence for tracking the display of each advertising video on said device.

The sequence may be broadcasted, for example over a TV channel, or as IP broadcast.

The method may comprise:
receiving at the platform a program;
combining the received program and said sequence to a new stream by replacing a portion of said received program with said sequence;
broadcasting from said platform said new stream.

The method may comprise:
detecting at the platform a start time of the break;
determining in the platform an estimated duration of the break;
inserting into said sequence a fill-in video content until the end of the break, wherein the fill-in video content is a video without any speech which can be appropriately interrupted at any time.

Instead of broadcasting, the sequence may be sent to one specific IP address using an adaptive streaming technology. In this case, the sequence may be a manifest file, or any equivalent file.

The estimated duration of the whole sequence may be based on a TV schedule.

The method may comprise a step of receiving data in the platform indicating that the duration of the break has been changed, or that the break has been split, or broadcasted at a different time, and automatically adapting said selection.

According to another aspect, the invention is also related to a method for automatic selection of video sequences to fill a break in a broadcasted program, comprising:

determining an estimated duration of the break;

selecting from a collection of videos, such as for example advertisings, promotions, jingles, bumpers, etc. a sequence of video to be played out, said sequence having a second duration which is shorter than said estimated duration, and wherein the selection depends on video play rules and on video priorities associated with at least some of said videos;

broadcasting said sequence of videos;

broadcasting a fill-in video content until the end of the break.

The fill in video content thus creates an interlude of variable length in order to fill the unpredictable time between the end of the sequence of advertising and the resumption of the TV program.

According to the invention, a method for automatic selection of videos to fill a break in a program may comprise:

receiving at a platform the program;

detecting at the platform a start time of the break;

determining in the platform an estimated duration of the break;

selecting in the platform from a collection of videos a sequence of videos to be played out, said sequence having a second duration which is shorter than said estimated duration, and wherein the selection depends on video play rules and on video priorities associated with at least some of said videos, wherein the video play rules determine that the sequence of videos has to start with a video of a first type, to terminate with a video of a second type;

combining the received program and the sequence of videos to a new stream by inserting into said break a sequence of videos and a fill-in video content until the end of the break, wherein the fill-in video content is a video without any speech which can be appropriately interrupted at any time;

sending from the platform said new stream.

The estimation of the duration may be based on a broadcaster server information, content detection server, human input, TV schedule, and/or on experience from previous breaks in similar programs or at similar times of the day.

The platform which replaces the content of the break may determine the end time of the break at the time when this estimated duration has expired. This might be convenient if the estimate is reliable, for example if it is based on reliable indications in a broadcast server.

An editor of the TV schedule, for example the broadcaster, may indicate in advance which duration and times in the TV schedule are reliable, and which one may be changed.

The platform which replaces the content of the break may determine the end time of the break at the reception time of a program resume signal. This signal may be sent in real time by the production on the broadcaster side.

The platform which replaces the content of the break may determine the end time of the break by analysing the video signal received from the broadcaster, in order to detect a sequence corresponding to an end of a break.

The end time of the break may be determined by analysing the video signal received from the broadcaster visually by a human person The platform which replaces the videos may determine the end time of the break by analysing data in a Cue Tone information contain in the signal.

The platform which replaces the videos may determine the end time of the break or its duration by decoding SCTE-35 or ESAM data in the signal, or other information in a manifest file.

The video priorities criteria may be numbers or marks indicating which videos are more important than others, and which videos need to be played out during a particular break.

The video play rules may be used for determining a sequence of videos during a break.

The break may be a commercial break. It may correspond to a program which has to be replaced, for example to a sport event or news program.

At least some of said broadcast priority criteria may be dependent on previously broadcasted videos or programs.

For example, it might be important to run an advertising related to a specific program in a break during this specific program, and less important to play it in another break.

Therefore, at least some of said broadcast priority criteria may be dependent on the program break or on the time of the day for example.

The method may comprise a selection among a plurality of fill in signals which are available. The fill-in video content that was used may be marked as such in order to avoid repetition.

The selection of videos in the sequence may be made before the start of the break. It may be made as soon as it is possible to estimate the duration of the break. It may be automatically adapted later on, even during the break, for example if a new estimate is determined or if the collection of advertisings or related priorities is changed. It may also be automatically adapted to the content of the program Data indicating that the duration of the break has been changed, or that the break has been split, or broadcasted at a different time may be received by the platform. In such a case, the selection of videos in the sequence is automatically adapted.

The video signal may be delayed, preferably by less than 5 minutes, in order to make or adapt the selection.

The program may be broadcasted over a TV channel.

The may be broadcasted over Internet.

The invention is also related to an platform for selecting video sequences to fill a break in a broadcasted channel, comprising:

a collection of videos to be played out;

a receiver for receiving a TV schedule;

processing means;

a software module arranged for causing said processing means to determine an estimated duration of the break;

a software module arranged for causing said processing means to select from said collection a sequence of videos to be played out, said sequence having a second duration which is shorter than said estimated duration, and wherein the selection depends on video priorities associated with at least some of said videos and on video play rules, a broadcasting module for broadcasting said sequence of videos followed by a fill-in video content until the end of the break.

Some of the videos may have a validity date for the broadcasting.

Some of the videos may be advertisings.

Some of the videos may be promotions.

Some of the videos may be bumpers. A bumper is a short video ad that usually plays before or after a video ad slot.

Some of the videos may be jingles.

The platform may comprise a memory for storing a TV schedule, wherein said estimated duration is based on the TV schedule.

The platform may comprise means for receiving a program resume signal and for determining said end of the break when said program resume signal is received.

The platform may comprise a memory for storing a plurality of fill in video contents.

The platform may comprise a buffer memory for delaying the received video signal by less than 5 minutes, in order to make the selection.

BRIEF DESCRIPTION OF THE DRAWINGS

The invention will be better understood with the aid of the description of an embodiment given by way of example and illustrated by the figures, in which:

FIG. 8 illustrates an example of template according to the invention.

DETAILED DESCRIPTION OF POSSIBLE EMBODIMENTS OF THE INVENTION

Figure 1:
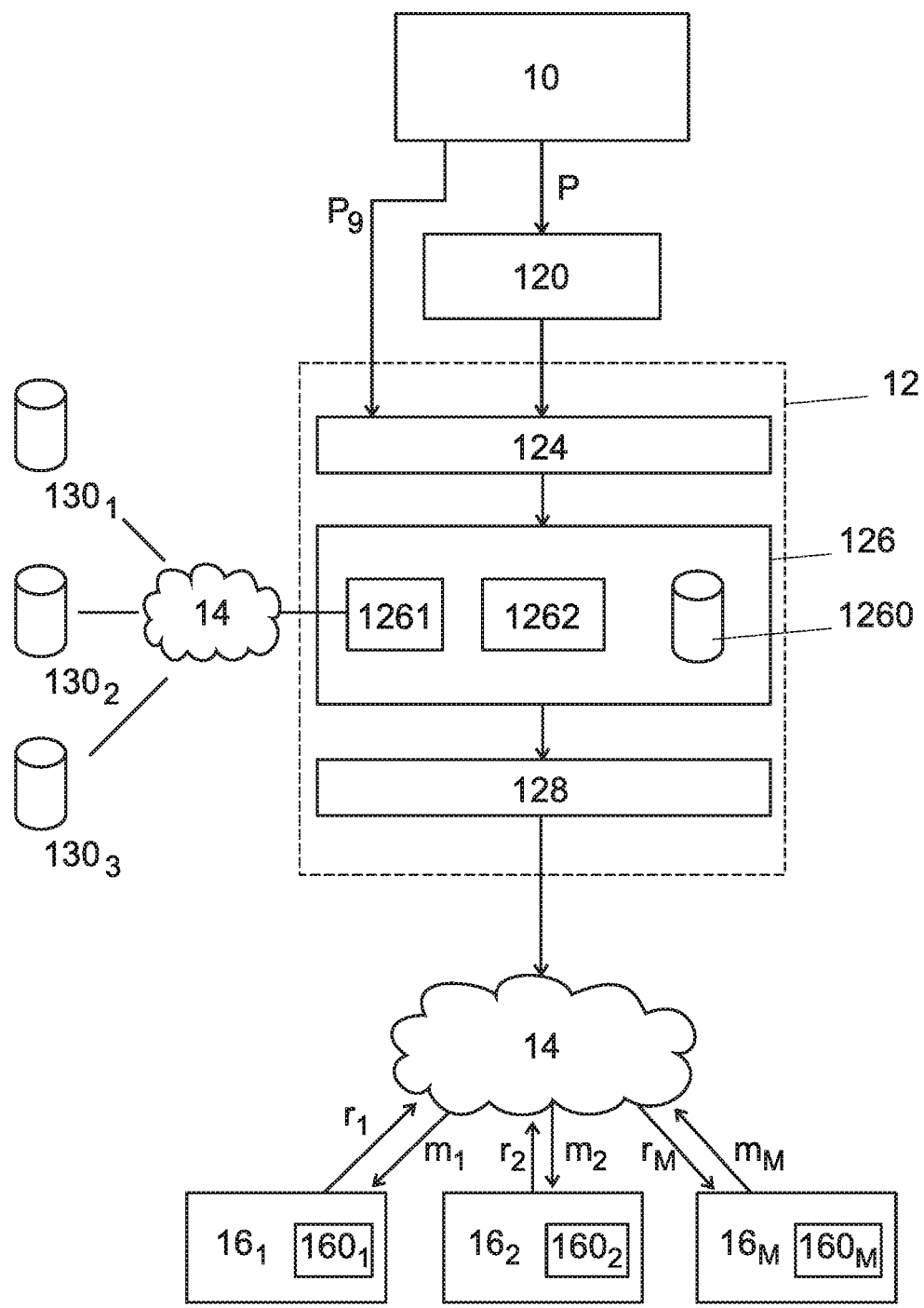
FIG. 1 shows a pictorial diagram of a system that could be used for selecting advertising videos to fill a break.

Reference is made to FIG. 1 which illustrates an example of system that could be used for carrying out the methods of the present invention. This embodiment is well adapted to videos sent in streaming mode.

The system comprises a video provider 10, for example a broadcaster such as a TV channel, a TV service provider or a provider of video content to be sent in streaming mode to users over the Internet.

The video provider 10 transmits a video, for example a video program p, to an audience, for example over TV networks and/or over the Internet.

Optionally, the video provider 10 may also publish using standard files or online service a TV schedule (updated in real time) pg which includes for example the estimated start times t0 and/or end times t1 of at least some of the breaks such as commercial breaks, in the program p. Other information might be included in the TV schedule, such as for example the content of actual programs, etc. This TV schedule may be available in any possible form, for example as a database, spreadsheet, XML-document, collection or e-mail, SOAP source, etc. It may be made available to the platform well in advance of the corresponding program, for example two weeks in advance, and updated until the last moment. The complete TV schedule, or at least the estimated start time and end time of the breaks, may be transmitted as digital data within the video signal, for example as a SCTE-35 or ESAM marker in the video signal.

A platform 12 receives this video p, as well as the optional schedule pg.

The platform 12 may be a relay for a video program p broadcasted in push mode, or act as a proxy for a video content p retrieved in pull mode by a user.

The platform 12 includes a receiver 120 for receiving the video. The receiver might include a buffer memory for buffering this content.

Processing means (not shown) are included in the platform 12. The processing means might include one or a plurality of processors in one or a plurality of servers, as well as one or a plurality of software modules that could be executed by those processors for carrying out some steps of the method.

A first, optional module 124 estimates the minimal duration $d_i$ of each break $b_i$ for which a content needs to be prepared or replaced. This estimation might be based on indications of the TV schedule, on information otherwise transmitted by the video provider 10, and/or on other data. For example, if the start time t0 or end time t1 of a particular break is not mentioned in the TV schedule, or if it is marked as unreliable, the estimation made by the module 124 might be based on similar previous breaks, for example on average durations of breaks previously played at similar time of the day, day of the week or during the same or similar programs. The module may also comprise means for detecting the start time of a break, and/or means for detecting the end time of the break, and for adapting the duration $d_i$ depending on those values. The detection of start time and/or end time may be based on signal or messages transmitted from the video provider 10, and/or on an automatic or manual analysis of the audio or video content.

A video selection module 126 selects a sequence $s_i$ of advertising videos $ad_j$ and of fill-in content to be played out during each break $b_i$ whose content needs to be replaced. The advertising videos are stored in a plurality of advertising video servers $130_1$, $130_2$, ..., $130_N$, and optionally in the platform 12. The video servers may be accessible over a network 14, for example over the Internet.

The video selection module 126 uses a collection of templates 1260. The templates may be edited, updated, created, copied and deleted by an operator of the platform 12, for example over an administration web page. Each template in the collection 1260 determines a sequence of video types to be played out. Examples of available video types includes at least jingles; fill-in video content; advertising video any of the video servers, etc. Other video types may define that the video is a pre-roll add, a bumper, a jingle, news etc.

The templates thus define video play rules to apply generally for a specific TV channel, for each break, for each recipient, etc. For example, a video play rule may determine that a specific video is mandatory within one break. Another rule may define which type of video will be deleted first if the duration of the break is shorten.

Figure 8:
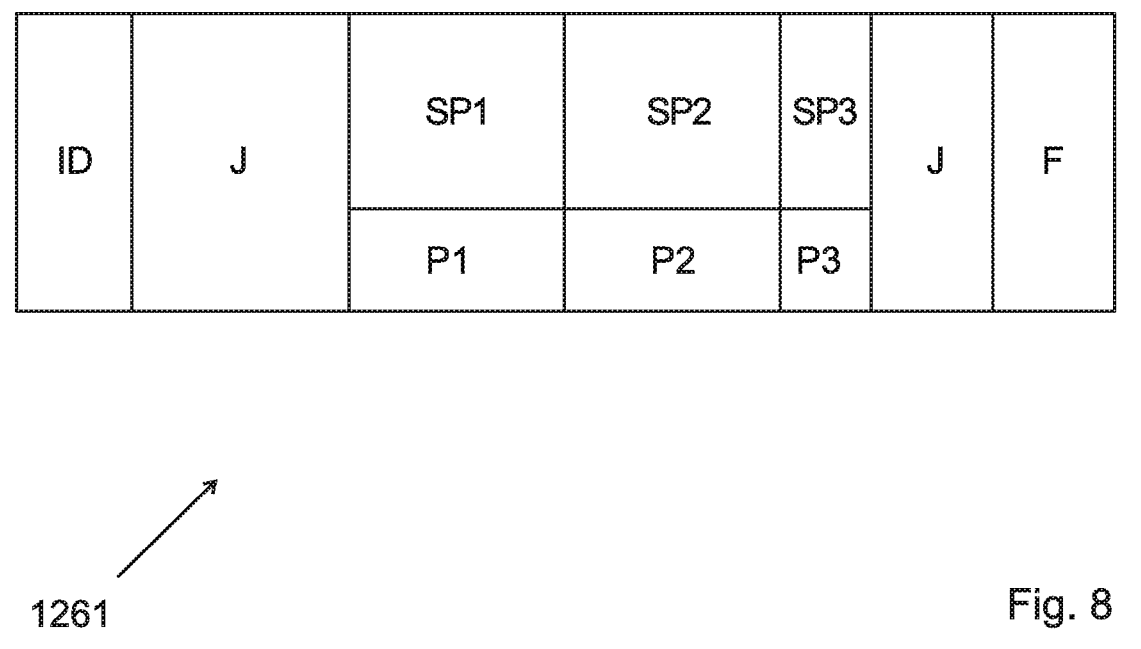

An example of template is illustrated on FIG. 8. In this example, the illustrated template 1261 defines that the sequence ID starts with a jingle J, and then comprises advertising videos SP1 from a first video server, then advertising videos SP2 from a second video server, advertising videos SP3 from a third video server, then a new jingle J, and finally a fill-in content F to adapt the length of the sequence to the duration $d_i$ of the break.

The template may also define parameters (here P1, P2 and P3) to be sent to the advertising servers 130 supplying the content SP1, SP2 and SP3 respectively.

The duration of some items may be fixed and determined in the template (for example a jingle of 15 seconds). The duration of other items in the template may be adaptable to the estimated duration of the break (for example, between 20 and 100 seconds from each video server).

The video selection module 126 is arranged for selecting from the collection 1260 one specific template to apply for a specific break. This selection of template may be made manually, by an operator. Alternatively, this selection of template may be performed automatically, based for example on a schedule or on other rules. For example, the video selection module 126 may be programmed to apply automatically a "prime time" template to all breaks during 7 and 9 PM.

Based on this template and on the estimated duration of the break to be filled, the platform 12 is further programed to determine the duration of series of advertising videos from each of the advertising video servers $130_i$ to be used in the template. It is also arranged for sending a request to those advertising video servers for series of advertising videos corresponding to each duration.

The requests may include parameters Pi from the template, and other parameters, for example parameters entered by an operator, parameters returned by other advertising video servers, and/or parameters determined or retrieved by the platform 12.

The selection parameters sent to the video servers may for example include at least one among:
- the type of device for which the advertising video series should be prepared, for example the type of device used by a recipient requesting a video content. Examples of types of device may include desktop, tablet, smartphone, set-top-box, etc.
- a user profile. This user profile may be retrieved for example from a profile database accessible by the platform 12, and/or from cookies in the device of a requesting recipient. The profile may include for example previously visited web sites, the age of the user, his gender, interests, etc.
- an advertising category. Examples of categories may include for example drugs; foods; cars; etc.
- an IP address, or elements retrieved from the IP address, such as the localisation of the recipient.
- a related program, for example information about a video program played out immediately before or after the break.
- an external parameter, such as for example weather parameters (for promoting BBQ food if the weather forecasts are good, etc.).
- a channel for which the video advertising
- a time at which the series will be played.

At least some of those parameters may also be used for selecting a template to use (in order for example to select a template "summer prime time advertising break" in order to fill a break during prime time in the summer). Moreover, the format of the template may be adapted as a function of those parameters.

The video servers $130i$ can receive those requests, and are arranged for delivering series of advertising videos corresponding to the requested duration and parameters. The series include a plurality of advertising videos, selected by each of the selected servers $130_i$.

Different videos in the video servers $130_i$ may have different lengths. The selection of videos takes those different lengths into account, so as to fit the requested duration if possible.

As will be seen, at least some of the videos $ad_j$ in the video servers $130_i$ might be associated with priorities $priority_i$. A video associated with a high priority is therefore more likely to be played out than a video associated with a low priority. In one example, the priorities may have a maximum value of $priority_{max}$ and a minimum value of $priority_{min}$.

Furthermore, some of the videos $ad_j$ in the servers $130_i$ might be associated with a video category. For example, the video category may indicate that an ad is for a sport or food product, for example. Other categories may define that an advertising video is more adapted for children or for adults.

The parameters Pi requested by the module 126 may specify a video category, for example food. If the video category is not specified and not implicit, the video server 130i freely selects one category and returns the selected category to the module 1261. This information may be used by the selection module 126 to avoid for example two advertising for products of a same category, for example two advertising videos for two different drinks, to be played one after the other in one sequence.

The series returned to the platform 12 may include the advertising videos, or preferably links, such as URLs, to those advertising videos.

A stitching module 1262 is arranged for aggregating those series returned by the different selected video servers with additional content, such as for example ingles, fill-in content, and for delivering a sequence $m_i$ according to the selected template.

This sequence $m_i$ is sent to user devices $16_i$, in broadcast mode or, as illustrated in this example, in streaming mode to requesting devices such as PCs, set-top-boxes, tablets, smartphones, etc. The sequence $m_i$ may be sent in reply to a request $r_i$ from the device $16_i$.

The user devices of the recipient $16_i$ include a video player $160_i$ for playing out the sequence to the recipient. An additional program may be used for detecting time codes in the sequence, and send messages to the advertising servers 130i to inform them that a specific video has been played, and to which extent (for example 25%, 50%, 75%, 100%).

Figure 2:
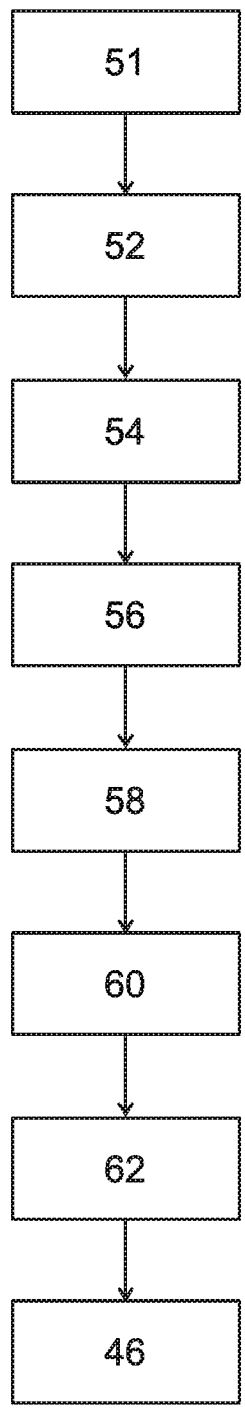
FIG. 2 is a flowchart of an example of method for automatic selection of advertising videos to fill a break.

FIG. 2 is a flowchart of an example of method according to one aspect of the invention.

In step 51 (optional), a recipient with a user device 16 requests a specific program or video content. This request $r_i$ is sent to a platform 12 that acts as a proxy for the server delivering this content. This step may be omitted if the video program is sent in broadcast mode to all recipients.

In step 52, the platform 12 stores templates 1261 in a collection 126, for example in a database or as a collection of files. Each template defines a format of a sequence of videos to be played during one break, for example a sequence of video types to be applied.

In step 54, one template is selected from this collection. The selection may be automatic, for example based on predefined criteria such as the channel, the time of the break, the duration of the break, etc. As already mentioned, other template selection parameters may be used, including information from an electronic program guide, external events, etc.

Parameters to be applied for this template may also be defined, for example the categories of videos that need to be included or excluded in the sequence.

In step 56, the platform 56 estimates the duration of a plurality of series of advertising videos to be retrieved from advertising video servers 130. This duration depends on the selected template and on the estimated total duration of the break. For example, a template may define a minimal and/or a maximal duration for each series of videos to be retrieved from the advertising servers; the effective duration will then be adapted within those limits to fit the duration of the break.

In step 58, the platform 12 sends a request for advertising video to a plurality of advertising video servers 130 indicated in the selected template. The request includes the estimated duration of the series, and, optionally, parameters from the templates or otherwise retrieved parameters.

In step 60, each selected advertising video server 130 selects and returns a series of advertising videos corresponding to the requested duration and to the parameters, if any. Videos associated with a higher priority are more likely to be included in the series than videos associated with a lower priority. The video server 130 may also return parameters related to the selection, such as for example the categories of each advertising video included, and/or the duration of the selection.

In step 62, a stitching module 1262 in the selection module 126 in platform 12 collects the series of advertising videos returned by the various selected video servers, and aggregates them with additional content (such as jingles, fill-in content, etc) according to the selected template.

The platform 12 may also insert or edit or otherwise use time codes in the sequence for tracking the display of each advertising video on said device.

In step 46, the sequence sending module 128 in the platform 12 sends the aggregated sequence to the user devices 16, either as a replacement of an existing portion of a program, or as an insertion to a requested video. The sequence may be for example a manifest file including a list of URLs to various pieces of video content to be played out. The sequence may be sent in streaming mode, for example according to the HLS or MPEG-Dash protocol.

This sequence is then received by the user devices of the requesting recipient 16, and played out with a video player $160_i$.

The player $160i$ may be modified in order to retrieve time codes inserted by the platform 12 and send a message to the advertising servers $130i$ that their advertising video has been played out, and to which extent.

Figure 3:
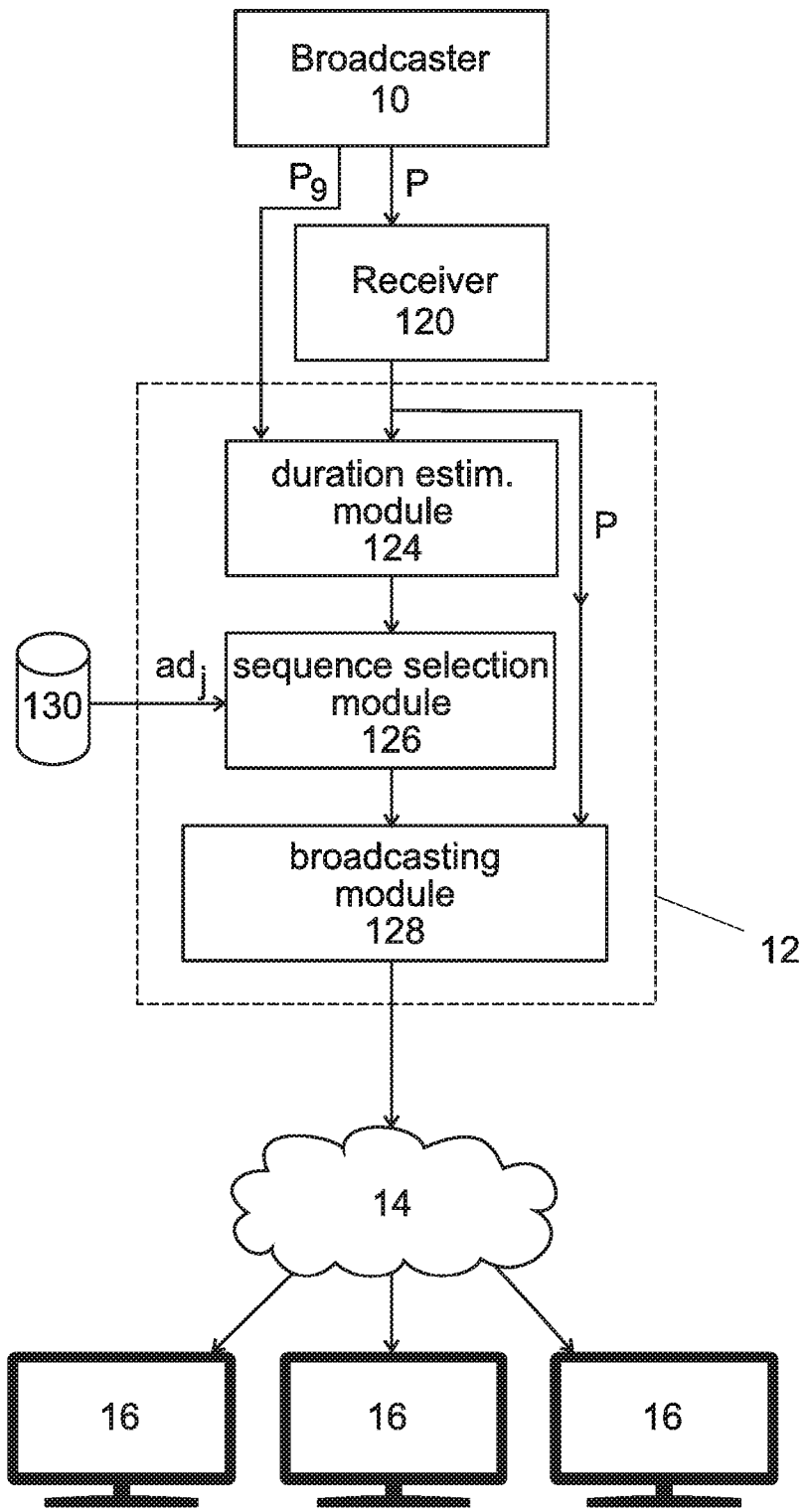
FIG. 3 shows a pictorial diagram of a system that could be used for carrying out the method of the present invention.

Reference is now made to FIG. 3 which illustrates another example of system according to one aspect of the present invention. This system is more adapted to the replacement of advertising breaks in broadcasted programs. All features of this embodiment may be combined with features of the embodiment previously described in relation with FIGS. 1 and 2, except when otherwise stated.

The system comprises a program provider, here a broadcaster 10, for example a TV channel or TV service provider. The broadcaster 10 transmits a video program p to an audience, for example over TV networks and/or over the Internet.

The broadcaster 10 may also publish using standard files or online service a TV schedule (updated in real time) pg which includes for example the estimated start times t0 and/or end times t1 of at least some of the breaks such as commercial breaks, in the program p. Other information might be included in the TV schedule, such as for example the content of actual programs, etc. This TV schedule may be available in any possible form, for example as a database, spreadsheet, XML-document, collection or e-mail, SOAP source, etc. It may be made available to the platform well in advance of the corresponding program, for example two weeks in advance, and updated until the last moment. The complete TV schedule, or at least the estimated start time and end time of the breaks, may be transmitted as digital data within the video signal, for example as a SCTE-35 or ESAM marker in the video signal.

A content replacement platform 12 receives this program p, as well as the detailed TV schedule pg. The TV schedule might be received directly from the broadcaster 10, for example over the Internet, and/or retrieved from a repository, for example from a web site or database. It may be stored in a memory of the platform 12. The part of the TV schedule pg related to a break might be updated by the broadcaster at any time before the transmission of this break, or even during the break.

The platform 12 includes a receiver 120 for receiving the program 120. The receiver might include a buffer memory for buffering this content.

Processing means are included in the platform 12. The processing means might include one or a plurality of processors in one or a plurality of servers, as well as one or a plurality of software modules that could be executed by those processors for carrying out some steps of the method.

A first module 124 estimates the minimal duration $d_i$ of each break $b_i$ whose content needs to be replaced. This estimation might be based on indications of the TV schedule, on information otherwise transmitted by the broadcaster, and/or on other data. For example, if the start time t0 or end time t1 of a particular break is not mentioned in the TV schedule, or if it is marked as unreliable, the estimation made by module 124 might be based on similar previous breaks, for example on average durations of breaks previously played at similar time of the day, day of the week or during the same or similar programs. The module may also comprise means for detecting the start time of a break, and/or means for detecting the end time of the break, and for adapting the duration $d_i$ depending on those values. The detection of start time and/or end time may be based on signal or messages transmitted from the broadcaster, and/or on an automatic or manual analysis of the audio or video content.

A second module 126 selects a sequence $s_i$ of videos $ad_j$ (for example advertisings) and of fill-in content to be played out during each break $b_i$ whose content needs to be replaced. The selection is made from a collection of videos advertisings in a database 130. The database could be one or a plurality of advertising servers on the web or any kind of database containing videos. Different videos in the database may have different lengths. The selection is made in advance, as soon as the duration of the break $d_i$ is known, and can be adapted automatically when this duration is recomputed.

As will be seen, at least some of the videos $ad_j$ in the advertising server 130 might be associated with priorities $priority_j$. A video associated with a high priority is therefore more likely to be played out than a video associated with a low priority. In one example, the priorities may have a maximum value of $priority_{max}$ and a minimum value of $priority_{min}$.

Furthermore, some of the videos $ad_j$ in the advertising server 130 might be associated with a video category. For example, the video category may define whether the video is an ad is for a sport or food product, for example.

Moreover, some video play rules may be defined. Those rules may apply generally for a specific TV channel or even for a platform; other rules may depend on each break. For example, a video play rule may determine that a break needs to start with a video of a first type (such as a jingle) and terminates with a video of a second type (for example another jingle). Another rule may determine that a specific video is mandatory within one break. A third rule may define which type of video will be deleted first if the duration of the break is shorten. Other video play rules may define the order of videos during a break. For example, a platform may enforce rules to start a commercial break with a 15-second jingle, then a bumper, then a series of ads in priority order, then an end-jingle and a fill-in content.

In order to apply those video play rules, a collection of templates 1260 may be used, as previously explained. Each template defines for example a sequence of video types, and possibly other rules, that should be used for all breaks using this template.

A broadcasting module as sequence sending module 128 receives the (possibly delayed) program p from receiver 120 as well as the sequence of replacement videos from the second module 126. The broadcasting module combines the two streams by replacing the content of the breaks $b_i$ with the new sequence and with a fill in video content.

The broadcasting module then transmits the new stream in broadcast mode to a plurality of recipients' user devices 16, for example over a network 14 such as a TV network, a cable TV network and/or the Internet. The recipients might use TV-sets, computers, tablets, mobile phones and/or any other consumer equipment suitable for receiving and reproducing the video stream.

Figure 4:
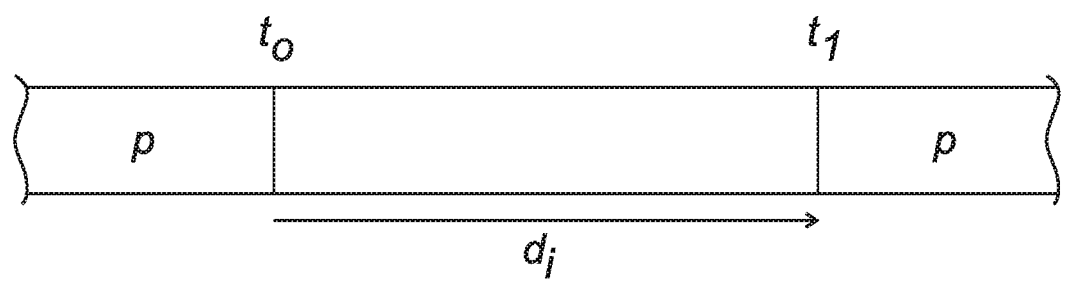
FIG. 4 illustrates a portion of a video stream where a main program is interrupted by a break, such as a commercial break.

FIG. 4 illustrates a portion of a video stream including a program p and a break of duration di between the times t0 and ti. This break should be filled or replaced with a new video content selected by the platform 12.

Figure 5:
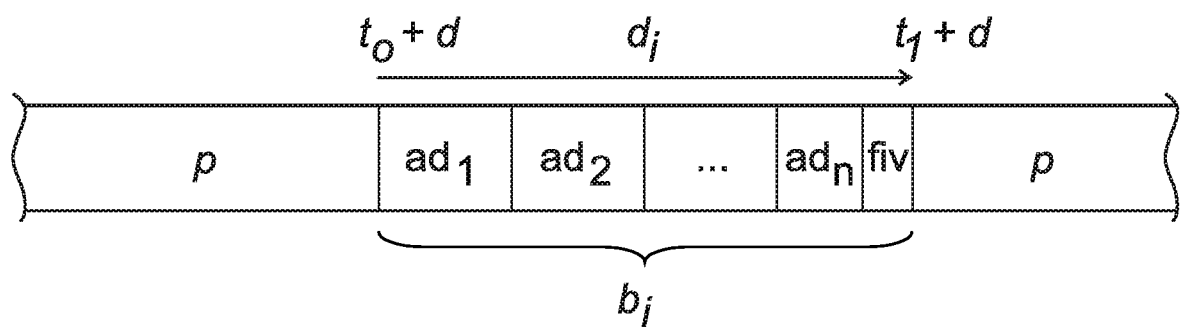
FIG. 5 illustrates another portion of the video stream in which the content of this break has been replaced by a new content.

FIG. 5 illustrates a portion of a video stream in which the content of a break $b_i$ (for example a commercial break) has been replaced by a sequence of n videos (for example advertisings) $ad_1$ to $ad_n$ selected from the advertising servers 130. The total duration of the selected videos $ad_i$ is shorter than the actual duration $d_i$ of the break to fill. The difference, i.e. the duration between the end of the last video $ad_n$ and the instant $t_i$ (or $t_i+d$ if the replacement stream is delayed with a delay d) where the main program p is resumed, is filled in with a fill-in video content fiv.

In case of bumpers inserted in this commercial break, the platform automatically inserts Start and Ending (if existing) bumpers at the location decided by the broadcaster (for example before and after a sequence of ads), and then adds promotion or extra content, or adds the start or at the end of the complete breaks, for example.

The fill-in video content is a video whose length can be adapted, for example a video which can be appropriately interrupted at any time. In one embodiment, the fill-in video content includes an animated logo or picture without any speech or hard to interrupt audio or video content.

Figure 6:
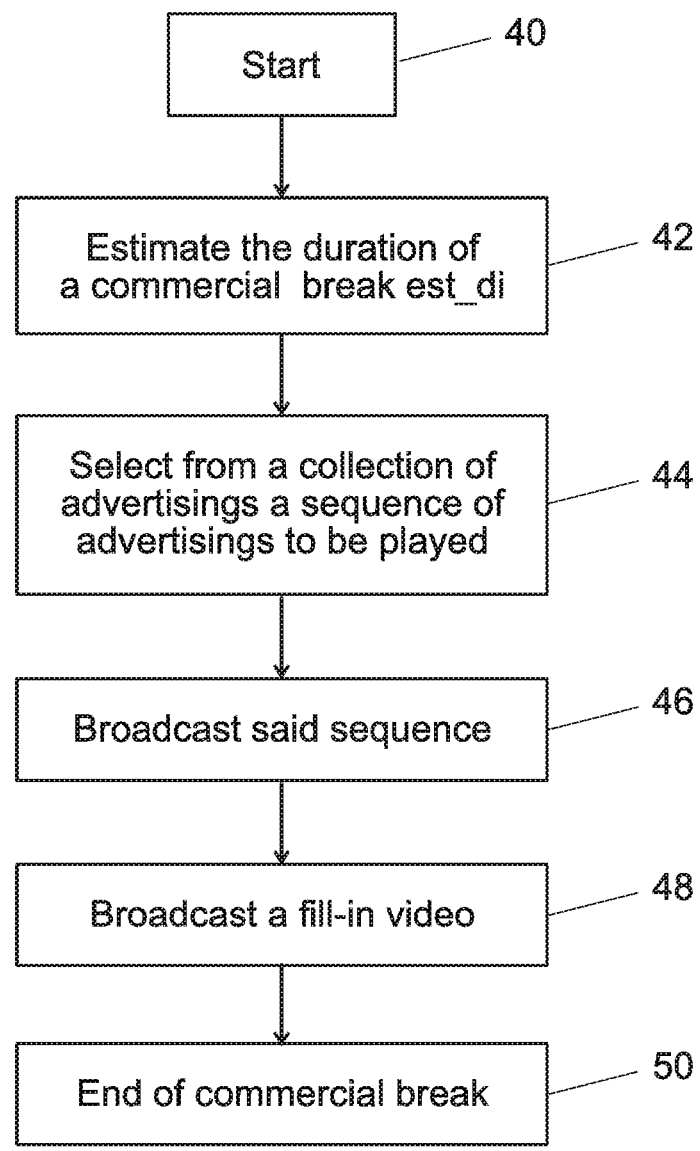
FIG. 6 is a flowchart of an example of method for replacing a content of a break with a new content.

FIG. 6 is a flowchart of an example of method for replacing a content of a break $b_i$, such as a commercial break, with a new content. The method might be carried out by the processing means in the content replacement platform 12.

The method starts at step 40. During step 42, the duration estimation module 124 estimates the minimum duration $est\_d_i$ of a next break, as previously explained. This estimation is preferably made in advance, but can be updated at any time before and even during the break, depending for example on the detected start time and end time of the break. The transmission of the program may be deferred by a delay d in order to take into accounts last minute changes of the estimate.

During step 44, the module 126 selects from a collection in selected advertising video servers 130 a list of videos $ad_j$ to be played out. The duration of the sequence is selected to be shorter or equal than the estimated minimal duration $est\_d_i$ of the break in order to fit this duration as closely as possible but without exceeding it. This list is updated if the estimated duration is recomputed.

During step 46, the broadcasting module 128 transmits in broadcast mode the program p with the replacement break to the recipients' user devices 16.

During step 48, the broadcasting module 128 transmits a fill in video selected from database 130, until the end of the break at step 50.

The end of the break may be determined from the TV schedule, with a signal transmitted by the broadcaster 10 (for example a SCTE-35 or ESAM marker), or by analysing the video stream received from this broadcaster with a suitable video analysis module able to detect the end of a break, or manually.

The fill in video content may comprise for example an animated picture. The fill-in video content may be stored in the database 130.

Figure 7:
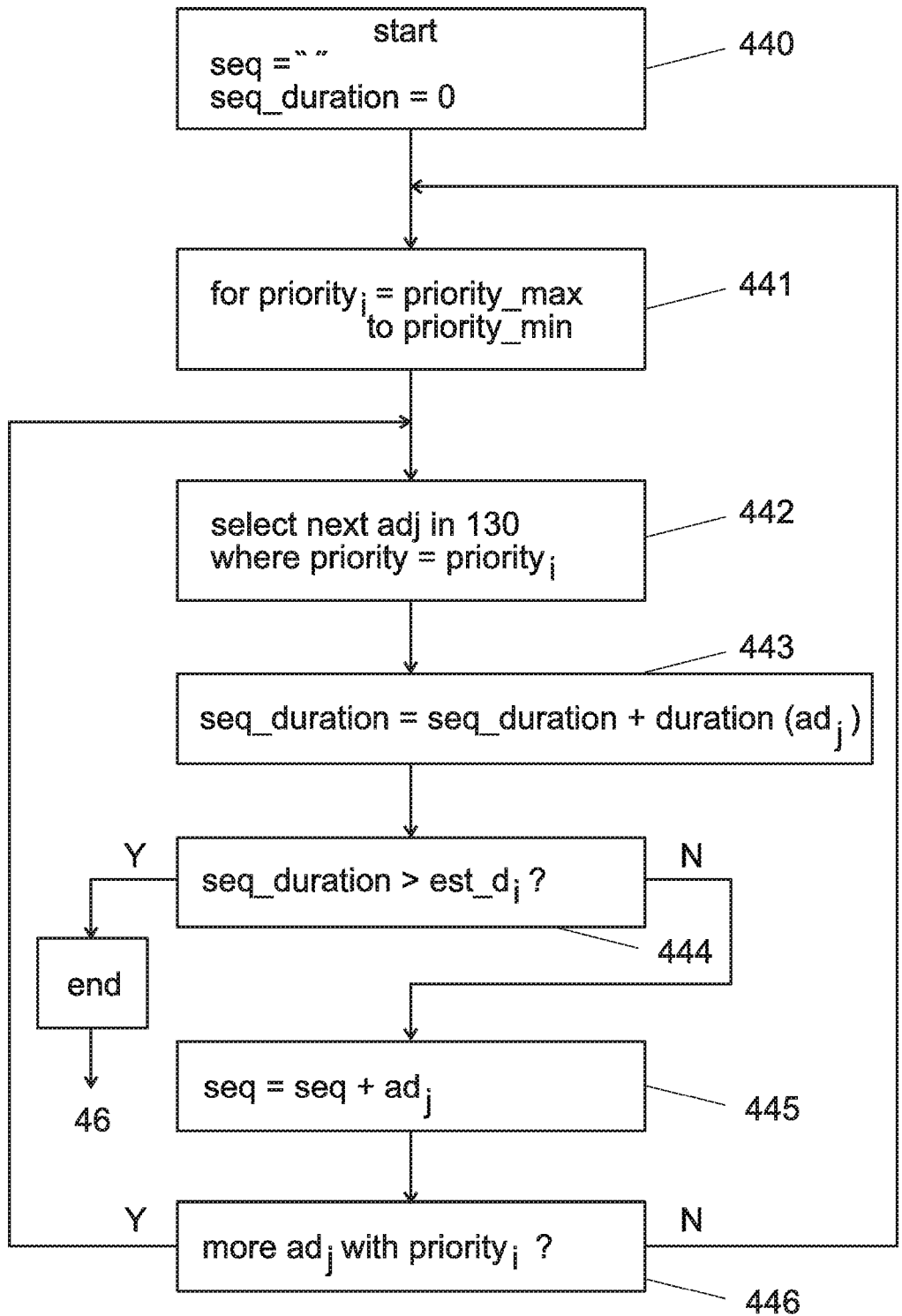
FIG. 7 is a flow chart of a method for selecting videos to be played out in the method of FIG. 4.

FIG. 7 is a flowchart which illustrates in more details and with pseudo code steps of a possible embodiment of the video selection step 44 in FIG. 6.

The process starts at step 440, during which a variable seq of type video_stream is set to Null. The variable seq_duration of type real is set to 0. Seq_duration indicates the total duration of the selected videos $ad_j$.

A loop is then started at step 441 for decreasing successive values of priorities, from $priority_{max}$ to $priority_{min}$.

During step 442 within the loop, the module 44 selects the next video $ad_j$ from the collection of videos in database 130 with the current priority value $priority_i$.

The selection of the next video within step 442 may also depend on the predefined rules that apply to each break. For example, a rule may prevent two advertisings for the same category of products or from the same advertisers to be played consecutively. Another rule may force the category of advertising to be played at various positions during the break.

The selection of videos may thus depend on those rules, and previously selected videos. Other videos/advertising may also depend on the content of the main program.

Some video play rules may also be specific for a certain video, or for a category of video content. An advertiser may for example prevent his video to be played before 8 PM. Another video play rule may define that all ads for children toys have to be played in a commercial break during a children program.

The selection of the next video to be played at step 442 thus depends on the priorities associated with the remaining videos in the advertising video server 130, and to video play rules associated with a channel, with a specific break or with a specific video or category of video.

At step 443, the module 43 increases the value of the variable seq_duration by adding the duration of the just selected video $ad_j$.

During step 444, the module 44 verifies whether the total duration seq_duration of the list of selected videos exceeds the estimated duration $est\_d_i$ of the break $b_i$.

If this is the case, the module goes further with step 46. If not, the module adds the previously selected video $ad_j$ to the sequence seq.

During the following step 446, the module verifies if there are more videos in the selected advertising server 130 with the currently selected priority level $priority_i$ and which fulfil the video play rules. If yes, the program returns to step 442 and select the next video with the same priority. Otherwise the module returns to step 441 and starts searching for videos associated with a lower priority in advertising server 130 and which fulfil the video play rules for the next position.

In a variant, a sorting may be made among videos with a same level of priority in order to select the video whose length best fit the rest duration until the estimated end of the break, and to reduce the duration of the fill in video content.

In another embodiment, videos with a lower priority are selected even when video associated with a higher priority are still available, when those low priority videos have a duration which is better adapted for filling in the estimated duration $d_i$.

The various operations of methods described above may be performed by any suitable means capable of performing the operations, such as various hardware and/or software component(s), circuits, and/or module(s). Generally, any operations described in the application may be performed by corresponding functional means capable of performing the operations. The various means, platforms, logical blocks, and modules may include various hardware and/or software component(s) and/or module(s), including, but not limited to software, services, databases and/or applications executed by servers, computers, or systems comprising a plurality of servers or computers, or any combination thereof designed to perform the functions described herein.

As used herein, the term "determining" encompasses a wide variety of actions. For example, "determining" may include calculating, computing, processing, deriving, investigating, looking up (e.g., looking up in a table, a database or another data structure), ascertaining, estimating and the like. Also, "determining" may include receiving (e.g., receiving information), accessing (e.g., accessing data in a memory) and the like. Also, "determining" may include resolving, selecting, choosing, establishing and the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A software module may consist of an executable program, a portion or routine or library used in a complete program, a plurality of interconnected programs, an "apps" executed by many smartphones, tablets or computers, a widget, a Flash application, a portion of HTML code, etc. A storage medium may be coupled to a processor such that the processor can read information from, and write information to, the storage medium. In the alternative, the storage medium may be integral to the processor. A database may be implemented as any structured collection of data, including a SQL database, a set of XML documents, a semantical database, or set of information available over an IP network, or any other suitable structure.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for automatic selection of a sequence of videos to fill a break in a video program, comprising:
storing a plurality of editable templates in a collection of templates accessible from a platform, wherein each template defines a sequence of video types to be played out during the break, available video types including at least jingles, fill-in video content or advertising videos from one or more servers;
selecting one template from said collection to apply to said break and applying one or more parameters to the said template;
determining in the platform a first duration of a first series of advertising videos and a second duration of a second series of advertising videos from the one or more servers;
sending from the platform a first request and a second request to the one or more servers for respectively the first series of advertising videos corresponding to the first duration, and the second series of advertising videos corresponding to the second duration;
receiving in said platform the first series of advertising videos and the second series of advertising videos from the one or more servers;
stitching in said platform a sequence including said first series, said second series, and at least one jingle or fill-in video content, according to the selected template; and
sending said sequence to at least one device.

2. The method of claim 1, further comprising: determining in the platform an estimated duration of the break; wherein the selected template requests fill-in video content to be played out until the end of the break, wherein the fill-in video content is a video without any speech which is appropriately interrupted at any time.

3. The method of claim 2, wherein at least a portion of said advertising videos are associated with video priorities, wherein advertising videos associated with a first priority are more likely to be played out than advertising videos associated with a second priority.

4. The method of claim 1, wherein said platform sends the one or more parameters to the one or more servers, wherein the selection of the advertising videos made by the one or more servers depends on the one or more parameters.

5. The method of claim 1, wherein said one or more parameters include at least one among: a type of the device; a user profile; a category of advertising; an IP address; and a related video program.

6. The method of claim 1, wherein the selected template to be applied, and/or the sequence of video types in one selected template, depends on at least one among: a type of the device; a user profile; a category of advertising; an IP address; and a related video program.

7. The method of claim 1, further comprising a step of inserting or editing one or more codes in said sequence for tracking a display of each advertising video on said device.

8. The method of claim 1, said step of sending said sequence comprises broadcasting said sequence.

9. The method of claim 8, further comprising: receiving at said platform the video program; combining the received video program and said sequence to a new stream by replacing a portion of said received video program with said sequence; and broadcasting from said platform said new stream.

10. The method of claim 1, further comprising: detecting at the platform a start time of the break; determining in the platform an estimated duration of the break; and inserting into said sequence a fill-in video content until the end of the break, wherein the fill-in video content is a video without any speech which is appropriately interrupted at any time.

11. The method of claim 1, said step of sending said sequence comprises sending said sequence to one specific IP address using an adaptive streaming technology.

12. The method of claim 11, wherein said sequence comprises a list of links.

13. The method of claim 2, wherein said estimated duration is based on a TV schedule.

14. The method of claim 2, further comprising receiving data in said platform indicating that the duration of the break has been changed, or that the break has been split, or broadcasted at a different time, and automatically adapting said selection.

15. The method of claim 1, wherein said selection is made or adapted before the start of the break.

16. A platform for automatic selection of a sequence of videos to fill a break in a video program, comprising:
   a collection of editable templates, wherein each template defines a sequence of video types to be played out during the break; said video types comprising at least jingles or fill-in video content; advertising videos from one or more servers;
   a processor configured to:
      select one template from said collection to apply to said break and applying one or more parameters to the said template, the selected template requesting advertising videos and at least one jingle or fill-in video content using the selected template from the one or more servers;
      send from said platform a first request and a second request to the one or more servers for respectively a first series of advertising videos corresponding to a first duration, and a second request for a second series of advertising videos corresponding to the second duration;
      receive the first series of advertising videos and the second series of advertising videos from the one or more servers;
      stitch a sequence including said first series, said second series, and at least one jingle or fill-in video content, according to the selected template; and
      send said sequence to at least one device.

17. A method for automatic selection of videos to fill a break in a program, comprising:
   receiving at a platform the program;
   detecting at the platform a start time of the break;
   determining in the platform a first duration of the break, the first duration comprising an estimated duration;
   selecting in the platform from a collection of videos a sequence of videos to be played out, said sequence having a second duration which is shorter than said first duration, wherein
      the selection depends on one or more rules and on one or more priorities associated with at least a portion of said videos, and
      the one or more rules determine that the sequence of videos has to start with a video of a first type, to terminate with a video of a second type;
   combining the received program and the sequence of videos to a new stream by inserting into said break the sequence of videos and a fill-in video content until the end of the break, wherein the fill-in video content is a video without any speech which is appropriately interrupted at any time; and
   sending from the platform said new stream.

18. The method of claim 17, wherein said estimated duration is based on a TV schedule.

19. The method of claim 17, further comprising a step of determining said end of the break when said estimated duration has expired.

20. The method of claim 17, further comprising a step of determining said end of the break when a program resume signal is received.

21. The method of claim 17, wherein at least a portion of said videos are associated with one or more video categories, and wherein at least a portion of the one or more rules determine a sequence of the video categories during the break.

22. The method of claim 17, further comprising defining a first rule of the one or more rules for a first break, and a second rule of the one or more rules for a second break.

23. The method of claim 17, further comprising selecting a fill-in video content among a plurality of fill-in signals, and marking the fill-in video content as used.

24. The method of claim 17, further comprising receiving data indicating that the duration of the break has changed, or that the break has been split, or broadcasted at a different time, and automatically adapting said selection.

25. The method of claim 17, wherein said selection is made or adapted before the start of the break.

26. The method of claim 17, wherein the program is broadcasted over a TV network.

27. The method of claim 17, wherein the program is sent over Internet as a broadcast signal or as an adaptive stream.

28. A replacement platform for replacing the content of a break in a TV program, comprising:
   a collection of videos to be played out;
   a receiver for receiving a TV schedule and the TV program;
   and a processor configured to:
   detect the start time of the break;
   determine a first duration of said break, the first duration comprising an estimated duration;
   select from said collection a sequence of videos to be played out, said sequence having a second duration which is shorter than said first duration,
      wherein the selection depends on one or more rules and on one or more priorities associated with at least a portion of said videos, and
      the one or more rules determine that the sequence of videos has to start with a video of a first type, to terminate with a video of a second type; and
   combine the received program and the sequence of videos to a new stream by replacing the content of the break with the sequence of videos and with a fill-in video content until the end of the break and for broadcasting said new stream, wherein the fill-in video content is a video without any speech which is appropriately interrupted at any time.

* * * * *